(12) United States Patent  (10) Patent No.: US 8,954,186 B2
Qian et al.  (45) Date of Patent: Feb. 10, 2015

(54) SELECTING REFERENCE LIBRARIES FOR MONITORING OF MULTIPLE ZONES ON A SUBSTRATE

(75) Inventors: Jun Qian, Sunnyvale, CA (US); Boguslaw A. Swedek, Cupertino, CA (US); Harry Q. Lee, Los Altos, CA (US); Jeffrey Drue David, San Jose, CA (US); Sivakumar Dhandapani, San Jose, CA (US); Thomas H. Osterheld, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 618 days.

(21) Appl. No.: 12/847,721

(22) Filed: Jul. 30, 2010

(65) Prior Publication Data

US 2012/0028813 A1 Feb. 2, 2012

(51) Int. Cl.
G05B 23/02 (2006.01)

(52) U.S. Cl.
CPC .. *G05B 23/0208* (2013.01); *G05B 2219/31459* (2013.01); *G05B 2219/45232* (2013.01)
USPC .................. 700/174; 702/1; 506/2; 438/692

(58) Field of Classification Search
CPC B24B 1/00; B24B 29/00; G05B 2219/45232; G05B 23/0208
USPC .................. 700/174; 506/2; 702/1; 438/692
See application file for complete search history.

(56) References Cited

U.S. PATENT DOCUMENTS

| | | | |
|---|---|---|---|
| 5,747,380 A | 5/1998 | Yu et al. | |
| 5,893,796 A | 4/1999 | Birang et al. | |
| 6,153,116 A | 11/2000 | Yang et al. | |
| 6,172,756 B1 | 1/2001 | Chalmers et al. | |
| 6,184,985 B1 | 2/2001 | Chalmers et al. | |
| 6,190,234 B1 | 2/2001 | Swedek et al. | |
| 6,204,922 B1 | 3/2001 | Chalmers | |
| 6,271,047 B1 | 8/2001 | Ushio et al. | |
| 6,296,548 B1 | 10/2001 | Wiswesser et al. | |
| 6,334,807 B1 | 1/2002 | Lebel et al. | |
| 6,358,327 B1 | 3/2002 | Pokharna et al. | |
| 6,361,646 B1 | 3/2002 | Bibby, Jr. et al. | |
| 6,489,624 B1 | 12/2002 | Ushio et al. | |

(Continued)

FOREIGN PATENT DOCUMENTS

EP 1176631 1/2002
JP 2000-183001 6/2000

(Continued)

OTHER PUBLICATIONS

International Search Report and Written Opinion for PCT/US2011/045096 mailed Mar. 27, 2012.

*Primary Examiner* — Mohammad Ali
*Assistant Examiner* — Sheela S Rao
(74) *Attorney, Agent, or Firm* — Fish & Richardson P.C.

(57) ABSTRACT

A method of configuring a polishing monitoring system includes receiving user input selecting a plurality of libraries, each library of the plurality of libraries comprising a plurality of reference spectra for use in matching to measured spectra during polishing, each reference spectrum of the plurality of reference spectra having an associated index value, for a first zone of a substrate, receiving user input selecting a first subset of the plurality of libraries, and for a second zone of the substrate, receiving user input selecting a second subset of the plurality of libraries.

19 Claims, 9 Drawing Sheets

(56) References Cited

U.S. PATENT DOCUMENTS

| | | | |
|---|---|---|---|
| 6,511,363 B2 | 1/2003 | Yamane et al. | |
| 6,609,086 B1 | 8/2003 | Bao et al. | |
| 6,618,130 B2 | 9/2003 | Chen | |
| 6,623,991 B2 | 9/2003 | Johnson et al. | |
| 6,670,200 B2 | 12/2003 | Ushio et al. | |
| 6,676,482 B2 | 1/2004 | Bibby, Jr. et al. | |
| 6,678,046 B2 | 1/2004 | Opsal | |
| 6,678,055 B2 | 1/2004 | Du-Nour et al. | |
| 6,762,838 B2 | 7/2004 | Du-Nour | |
| 6,768,967 B2 | 7/2004 | Johnson et al. | |
| 6,801,321 B1 | 10/2004 | Du-Nour | |
| 6,806,105 B2 | 10/2004 | Johnson et al. | |
| 6,806,948 B2 | 10/2004 | Katz et al. | |
| 6,813,034 B2 | 11/2004 | Rosencwaig et al. | |
| 6,815,947 B2 | 11/2004 | Scheiner et al. | |
| 6,819,426 B2 | 11/2004 | Sezginer et al. | |
| 6,836,328 B2 | 12/2004 | Opsal | |
| 6,842,259 B2 | 1/2005 | Rosencwaig et al. | |
| 6,885,467 B2 | 4/2005 | DuNour et al. | |
| 6,898,596 B2 | 5/2005 | Aikens et al. | |
| 6,908,374 B2 | 6/2005 | Wang et al. | |
| 6,947,135 B2 | 9/2005 | Johnson | |
| 6,995,842 B2 | 2/2006 | Opsal | |
| 7,018,271 B2 | 3/2006 | Wiswesser et al. | |
| 7,042,581 B2 | 5/2006 | Schietinger et al. | |
| 7,097,537 B1 | 8/2006 | David et al. | |
| 7,255,771 B2 | 8/2007 | Chen et al. | |
| 7,393,459 B2 | 7/2008 | Davis et al. | |
| 7,406,394 B2 | 7/2008 | Swedek et al. | |
| 7,409,260 B2 | 8/2008 | David et al. | |
| 7,444,198 B2 | 10/2008 | Ravid et al. | |
| 7,663,766 B2 | 2/2010 | Hartig et al. | |
| 7,764,377 B2 | 7/2010 | Benvegnu et al. | |
| 7,790,015 B2 | 9/2010 | Wang et al. | |
| 8,260,446 B2* | 9/2012 | David et al. | 700/109 |
| 2001/0039064 A1 | 11/2001 | Ushio et al. | |
| 2002/0001862 A1 | 1/2002 | Ushio et al. | |
| 2002/0127951 A1 | 9/2002 | Ishikawa et al. | |
| 2002/0155789 A1 | 10/2002 | Bibby, Jr. et al. | |
| 2002/0173084 A1 | 11/2002 | Ohkawa | |
| 2003/0002032 A1 | 1/2003 | DuNour | |
| 2003/0022400 A1 | 1/2003 | Nomoto et al. | |
| 2003/0098704 A1 | 5/2003 | DuNour et al. | |
| 2003/0153246 A1 | 8/2003 | Desai et al. | |
| 2003/0184732 A1 | 10/2003 | Katz et al. | |
| 2003/0205664 A1 | 11/2003 | Abe et al. | |
| 2004/0018647 A1 | 1/2004 | Jones et al. | |
| 2004/0080761 A1 | 4/2004 | Du-Nour et al. | |
| 2004/0092047 A1 | 5/2004 | Lymberopoulos et al. | |
| 2004/0185582 A1 | 9/2004 | Kueny | |
| 2005/0026542 A1 | 2/2005 | Battal et al. | |
| 2005/0117164 A1 | 6/2005 | Nomoto et al. | |
| 2005/0220386 A1 | 10/2005 | Nakada et al. | |
| 2006/0009131 A1 | 1/2006 | Swedek et al. | |
| 2006/0020419 A1 | 1/2006 | Benvegnu | |
| 2006/0166606 A1 | 7/2006 | Kobayashi et al. | |
| 2006/0246683 A1 | 11/2006 | Pan et al. | |
| 2006/0274326 A1 | 12/2006 | Kobayashi et al. | |
| 2006/0286904 A1 | 12/2006 | Swedek et al. | |
| 2007/0039925 A1 | 2/2007 | Swedek et al. | |
| 2007/0042675 A1 | 2/2007 | Benvegnu et al. | |
| 2007/0077671 A1 | 4/2007 | David et al. | |
| 2007/0100580 A1 | 5/2007 | Marcus et al. | |
| 2007/0224915 A1* | 9/2007 | David et al. | 451/5 |
| 2008/0009227 A1 | 1/2008 | Benvegnu et al. | |
| 2008/0099443 A1 | 5/2008 | Benvegnu et al. | |
| 2008/0111987 A1 | 5/2008 | Akashika et al. | |
| 2008/0206993 A1 | 8/2008 | Lee et al. | |
| 2009/0275265 A1 | 11/2009 | Qian et al. | |
| 2010/0070501 A1* | 3/2010 | Walsh et al. | 707/736 |
| 2010/0103422 A1 | 4/2010 | David et al. | |
| 2010/0105288 A1 | 4/2010 | Drue et al. | |
| 2010/0114532 A1 | 5/2010 | David et al. | |
| 2010/0130100 A1 | 5/2010 | David et al. | |

FOREIGN PATENT DOCUMENTS

| | | |
|---|---|---|
| JP | 2000-310512 | 11/2000 |
| JP | 2001-287159 | 10/2001 |
| JP | 2002-343842 | 11/2002 |
| JP | 2002-359217 | 12/2002 |
| JP | 2005-159203 | 6/2005 |
| WO | 00/54935 | 9/2000 |
| WO | 01/72470 | 10/2001 |
| WO | 2004/035265 | 4/2004 |
| WO | WO 2007/024807 | 3/2007 |
| WO | WO 2008/070736 | 6/2008 |
| WO | WO2009134865 A2 | 11/2009 |

\* cited by examiner

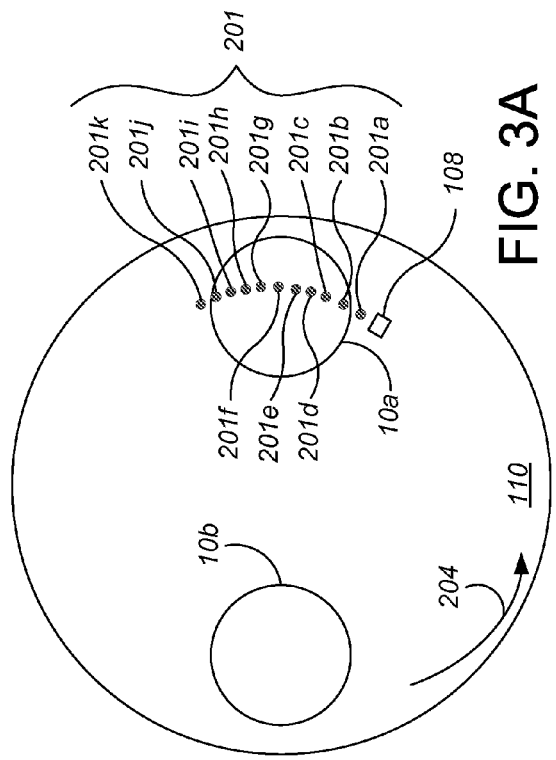
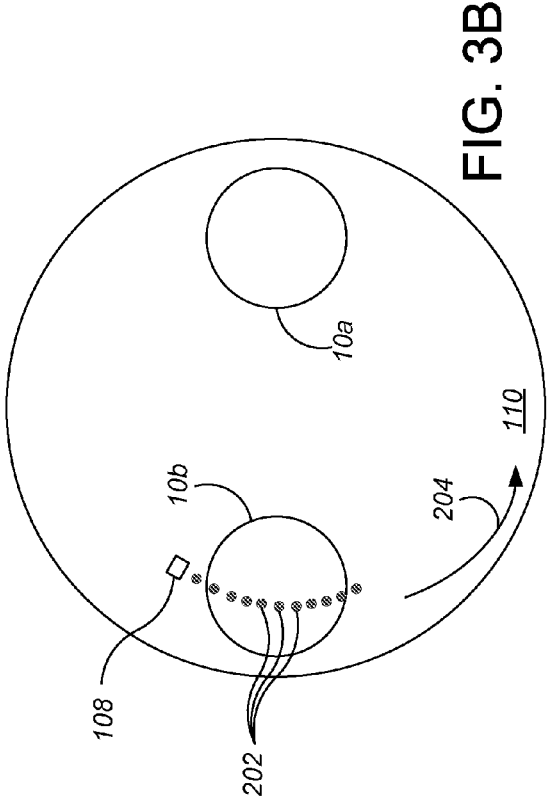
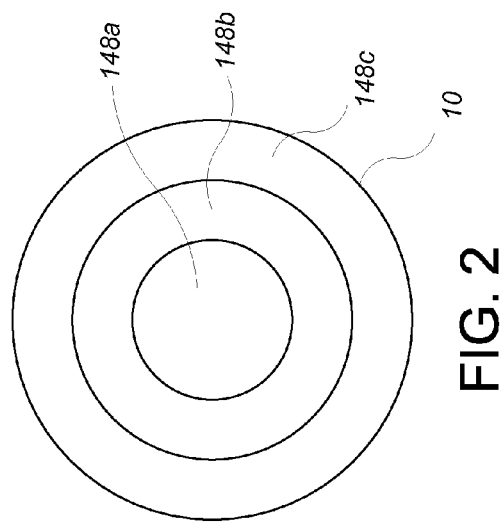

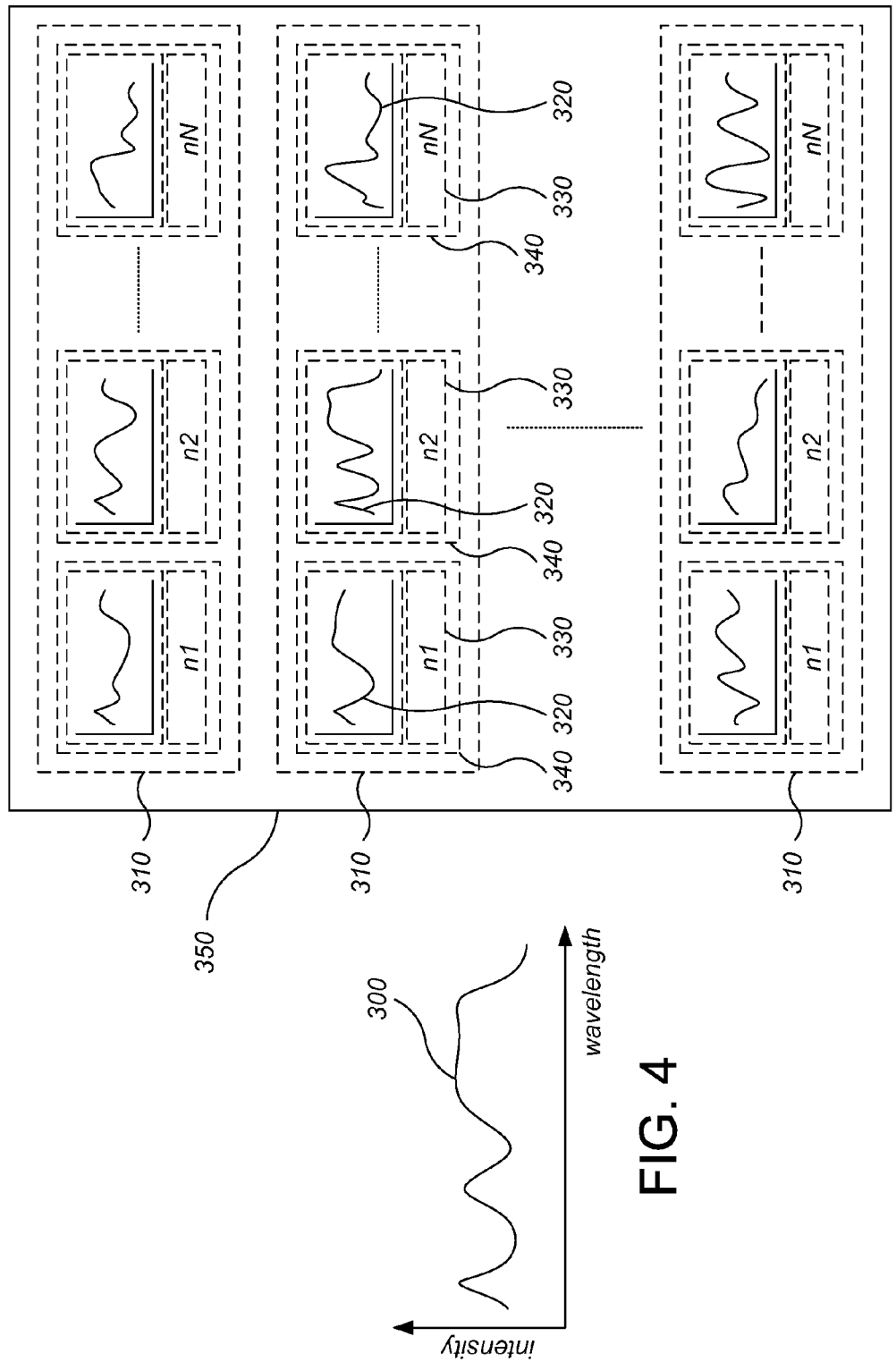

SELECTING REFERENCE LIBRARIES FOR MONITORING OF MULTIPLE ZONES ON A SUBSTRATE

TECHNICAL FIELD

The present disclosure relates generally to monitoring of multiple zones on a substrate during chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier head. The exposed surface of the substrate is typically placed against a rotating polishing pad with a durable roughened surface. The carrier head provides a controllable load on the substrate to push it against the polishing pad. A polishing liquid, such as a slurry with abrasive particles, is typically supplied to the surface of the polishing pad.

One problem in CMP is using an appropriate polishing rate to achieve a desirable profile, e.g., a substrate layer that has been planarized to a desired flatness or thickness, or a desired amount of material has been removed. Variations in the initial thickness of a substrate layer, the slurry composition, the polishing pad condition, the relative speed between the polishing pad and a substrate, and the load on a substrate can cause variations in the material removal rate across a substrate, and from substrate to substrate. These variations cause variations in the time needed to reach the polishing endpoint and the amount removed. Therefore, it may not be possible to determine the polishing endpoint merely as a function of the polishing time, or to achieve a desired profile merely by applying a constant pressure.

In some systems, a substrate is optically monitored in-situ during polishing, e.g., through a window in the polishing pad. However, existing optical monitoring techniques may not satisfy increasing demands of semiconductor device manufacturers.

SUMMARY

In one aspect, a method of configuring a polishing monitoring system includes receiving user input selecting a plurality of libraries, each library of the plurality of libraries comprising a plurality of reference spectra for use in matching to measured spectra during polishing, each reference spectrum of the plurality of reference spectra having an associated index value, for a first zone of a substrate, receiving user input selecting a first subset of the plurality of libraries, and for a second zone of the substrate, receiving user input selecting a second subset of the plurality of libraries.

Implementations may include one or more of the following features. The substrate may be polished in a polishing apparatus. A first sequence of spectra from the first zone of the substrate may be measured during polishing with an in-situ monitoring system. A best matching reference spectrum may be determined for each measured spectrum in the first sequence of spectra from the first zone, for each library from the first subset of the plurality of libraries. A first index value may be determined for each library from the first subset of libraries for each best matching reference spectrum for the first zone of the substrate to generate a first sequence of first index values for each library from the first subset of libraries. A second sequence of spectra may be measured from the second zone of the substrate during polishing with the in-situ monitoring system. A best matching reference spectrum may be determined for each measured spectrum in the second sequence of spectra from the second zone, for each library from the second subset of the plurality of libraries. A second index value may be determined for each library from the second subset of libraries for each best matching reference spectrum for the second zone of the substrate to generate a second sequence of second index values for each library from the second subset of libraries. For each library from the first subset of libraries, a first function may be fit to the first sequence of first index values, and for each library from the second subset of libraries, a second function may be fit to the second sequence of second index values. A goodness of fit for each library from the first subset of libraries may be determined and a goodness of fit for each library from the second subset of libraries may be determined. A first library having the best goodness of fit of first subset of libraries may be selected and a second library having the best goodness of fit of second subset of libraries may be selected. A projected time for the first zone to reach a first target index value may be determined based on the first linear function for the first library. A polishing parameter for the second zone may be adjusted based on the second linear function of the second library to adjust the polishing rate of the second zone such that the second zone has closer to a second target index value at the projected time than without such adjustment. The polishing parameter may be a pressure in a carrier head of the polishing apparatus. The first sequence of first index values and the first function based on the first library may be displayed on a display. Each first sequence of first index values and each first function for each of the first subset of libraries may be displayed simultaneously on a display. Receiving user input selecting the plurality of libraries may include displaying a drop-down list having a multiplicity of libraries. Receiving user input selecting the plurality of libraries may include selecting the plurality of libraries from the multiplicity of libraries in the drop-down list. Receiving user input selecting the first subset of libraries may include displaying a user interface having a first check box for each of the plurality of libraries and receiving user input selecting or deselecting one or more first check boxes. Receiving user input selecting the second subset of libraries may include displaying a user interface having a second check box for each of the plurality of libraries and receiving user input selecting or deselecting one or more second check boxes. The user interface having the first check box for each of the plurality of libraries and the user interface having the second check box for each of the plurality of libraries may be displayed simultaneously. The first check box for each of the plurality of libraries and the second check box for each of the plurality of libraries may be displayed in the same window.

In other aspects, polishing systems and computer-program products tangibly embodied on a computer readable medium are provided to carry out these methods.

Certain implementations may have one or more of the following advantages. Improved spectra matching can be obtained by matching the spectra collected from the edge of the wafer to reference spectra collected from the similar locations, which can enable more accurate control by a computer software-integrated polishing apparatus. A software user interface that allows the controller of the polishing process to select zone-specific libraries of reference spectra can further improve the polishing process, particularly along the edges of the substrate.

The details of one or more implementations are set forth in the accompanying drawings and the description below. Other features, aspects, and advantages will become apparent from the description, the drawings, and the claims.

BRIEF DESCRIPTION OF THE DRAWINGS

FIG. 2 illustrates a schematic top view of a substrate having multiple zones.

FIG. 3A illustrates a top view of a polishing pad and shows locations where in-situ measurements are taken on a first substrate.

FIG. 3B illustrates a top view of a polishing pad and shows locations where in-situ measurements are taken on a second substrate.

FIG. 4 illustrates a measured spectrum from the in-situ optical monitoring system.

FIG. 5 illustrates a library of reference spectra.

Like reference numbers and designations in the various drawings indicate like elements.

DETAILED DESCRIPTION

By determining a polishing rate for each zone of a substrate from in-situ measurements, a projected endpoint time for a target thickness or a projected thickness for target endpoint time can be determined for each zone, and the polishing rate for at least one zone can be adjusted so that the zones achieve closer endpoint conditions. By "closer endpoint conditions," it is meant that the zones o would reach their target thickness closer to the same time than without such adjustment, or if the zones halt polishing at the same time, that the zones o would have closer to the same thickness than without such adjustment.

During spectrographic monitoring, it can be useful to compare a measured spectrum to a library of reference spectra and determine which reference spectrum from the library is the closest match. A way to improve the polishing process is to use libraries of reference spectra. For example, the libraries can include reference spectra which represent different patterned substrates, or different zones within a substrate. The use of multiple libraries of reference spectra can be especially beneficial in providing improving accuracy in tracking the progress of polishing along the edges of a substrate where polishing rates may be non-linear, thus permitting more reliable polishing rate control and thus improved within-wafer nonuniformity. Moreover, if a user controlling the polishing process can select (e.g., using a software user interface) specific libraries for use in certain zones, the polishing process can be improved further, e.g., based on operator knowledge of prior satisfactory or unsatisfactory results from various libraries, such as to improve polishing uniformity, particularly along the edge of the substrate.

Figure 1:
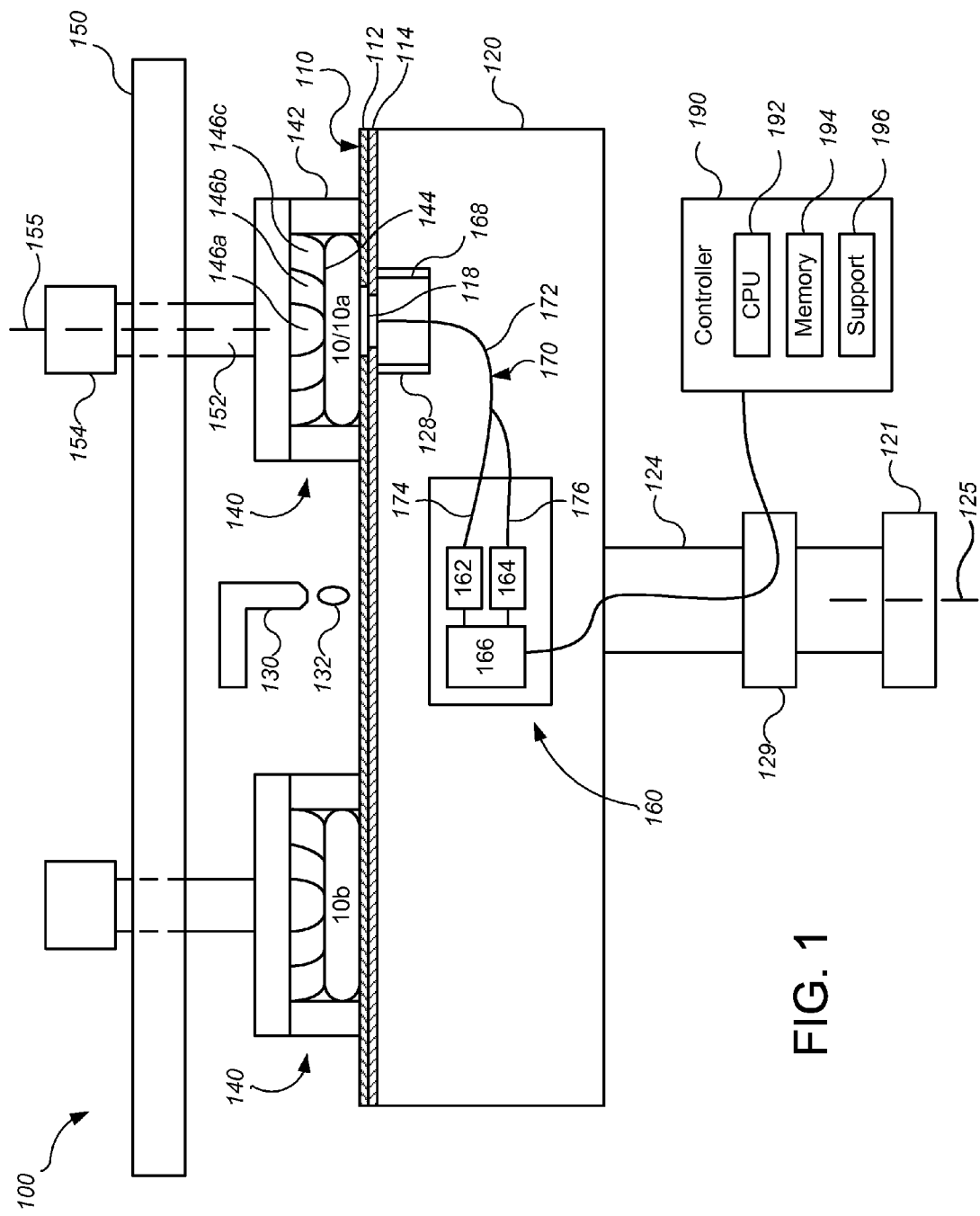
FIG. 1 illustrates a schematic cross-sectional view of an example of a polishing apparatus having two polishing heads.

FIG. 1 illustrates an example of a polishing apparatus 100. The polishing apparatus 100 includes a rotatable disk-shaped platen 120 on which a polishing pad 110 is situated. The platen is operable to rotate about an axis 125. For example, a motor 121 can turn a drive shaft 124 to rotate the platen 120. The polishing pad 110 can be detachably secured to the platen 120, for example, by a layer of adhesive. The polishing pad 110 can be a two-layer polishing pad with an outer polishing layer 112 and a softer backing layer 114.

The polishing apparatus 100 can include a combined slurry/rinse arm 130. During polishing, the arm 130 is operable to dispense a polishing liquid 132, such as a slurry, onto the polishing pad 110. While only one slurry/rinse arm 130 is shown, additional nozzles, such as one or more dedicated slurry arms per carrier head, can be used. The polishing apparatus can also include a polishing pad conditioner to abrade the polishing pad 110 to maintain the polishing pad 110 in a consistent abrasive state.

In this embodiment, the polishing apparatus 100 includes two (or two or more) carrier heads 140. Each carrier head 140 is operable to hold a substrate 10 (e.g., a first substrate 10a at one carrier head and a second substrate 10b at the other carrier head) against the polishing pad 110, i.e., the same polishing pad. Each carrier head 140 can have independent control of the polishing parameters, for example pressure, associated with each respective substrate.

In particular, each carrier head 140 can include a retaining ring 142 to retain the substrate 10 below a flexible membrane 144. Each carrier head 140 also includes a plurality of independently controllable pressurizable chambers defined by the membrane, e.g., 3 chambers 146a-146c, which can apply independently controllable pressurizes to associated zones 148a-148c on the flexible membrane 144 and thus on the substrate 10 (see FIG. 2). Referring to FIG. 2, the center zone 148a can be substantially circular, and the remaining zones 148b-148e can be concentric annular zones around the center zone 148a. Although only three chambers are illustrated in FIGS. 1 and 2 for ease of illustration, there could be two chambers, or four or more chambers, e.g., five chambers.

Returning to FIG. 1, each carrier head 140 is suspended from a support structure 150, e.g., a carousel, and is connected by a drive shaft 152 to a carrier head rotation motor 154 so that the carrier head can rotate about an axis 155. Optionally each carrier head 140 can oscillate laterally, e.g., on sliders on the carousel 150; or by rotational oscillation of the carousel itself. In operation, the platen is rotated about its central axis 125, and each carrier head is rotated about its central axis 155 and translated laterally across the top surface of the polishing pad.

While only two carrier heads 140 are shown, more carrier heads can be provided to hold additional substrates so that the surface area of polishing pad 110 may be used efficiently. Thus, the number of carrier head assemblies adapted to hold substrates for a simultaneous polishing process can be based, at least in part, on the surface area of the polishing pad 110.

The polishing apparatus also includes an in-situ monitoring system 160, which can be used to determine whether to adjust a polishing rate or an adjustment for the polishing rate as discussed below. The in-situ monitoring system 160 can include an optical monitoring system, e.g., a spectrographic monitoring system, or an eddy current monitoring system.

In one embodiment, the monitoring system 160 is an optical monitoring system. An optical access through the polishing pad is provided by including an aperture (i.e., a hole that runs through the pad) or a solid window 118. The solid window 118 can be secured to the polishing pad 110, e.g., as a plug that fills an aperture in the polishing pad, e.g., is molded to or adhesively secured to the polishing pad, although in some implementations the solid window can be supported on the platen 120 and project into an aperture in the polishing pad.

The optical monitoring system 160 can include a light source 162, a light detector 164, and circuitry 166 for sending and receiving signals between a remote controller 190, e.g., a computer, and the light source 162 and light detector 164. One or more optical fibers can be used to transmit the light from the light source 162 to the optical access in the polishing pad, and to transmit light reflected from the substrate 10 to the detector 164. For example, a bifurcated optical fiber 170 can be used to transmit the light from the light source 162 to the substrate 10 and back to the detector 164. The bifurcated optical fiber an include a trunk 172 positioned in proximity to the optical access, and two branches 174 and 176 connected to the light source 162 and detector 164, respectively.

In some implementations, the top surface of the platen can include a recess 128 into which is fit an optical head 168 that holds one end of the trunk 172 of the bifurcated fiber. The optical head 168 can include a mechanism to adjust the vertical distance between the top of the trunk 172 and the solid window 118.

The output of the circuitry 166 can be a digital electronic signal that passes through a rotary coupler 129, e.g., a slip ring, in the drive shaft 124 to the controller 190 for the optical monitoring system. Similarly, the light source can be turned on or off in response to control commands in digital electronic signals that pass from the controller 190 through the rotary coupler 129 to the optical monitoring system 160. Alternatively, the circuitry 166 could communicate with the controller 190 by a wireless signal.

The light source 162 can be operable to emit white light. In one implementation, the white light emitted includes light having wavelengths of 200-800 nanometers. A suitable light source is a xenon lamp or a xenon mercury lamp.

The light detector 164 can be a spectrometer. A spectrometer is an optical instrument for measuring intensity of light over a portion of the electromagnetic spectrum. A suitable spectrometer is a grating spectrometer. Typical output for a spectrometer is the intensity of the light as a function of wavelength (or frequency).

As noted above, the light source 162 and light detector 164 can be connected to a computing device, e.g., the controller 190, operable to control their operation and receive their signals. The computing device can include a microprocessor situated near the polishing apparatus, e.g., a programmable computer. With respect to control, the computing device can, for example, synchronize activation of the light source with the rotation of the platen 120.

In some implementations, the light source 162 and detector 164 of the in-situ monitoring system 160 are installed in and rotate with the platen 120. In this case, the motion of the platen will cause the sensor to scan across each substrate. In particular, as the platen 120 rotates, the controller 190 can cause the light source 162 to emit a series of flashes starting just before and ending just after each substrate 10 passes over the optical access. Alternatively, the computing device can cause the light source 162 to emit light continuously starting just before and ending just after each substrate 10 passes over the optical access. In either case, the signal from the detector can be integrated over a sampling period to generate spectra measurements at a sampling frequency.

In operation, the controller 190 can receive, for example, a signal that carries information describing a spectrum of the light received by the light detector for a particular flash of the light source or time frame of the detector. Thus, this spectrum is a spectrum measured in-situ during polishing.

As shown by in FIG. 3A, if the detector is installed in the platen, due to the rotation of the platen (shown by arrow 204), as the window 108 travels below one carrier head (e.g., the carrier head holding the first substrate 10*a*), the optical monitoring system making spectra measurements at a sampling frequency will cause the spectra measurements to be taken at locations 201 in an arc that traverses the first substrate 10*a*. For example, each of points 201*a*-201*k* represents a location of a spectrum measurement by the monitoring system of the first substrate 10*a* (the number of points is illustrative; more or fewer measurements can be taken than illustrated, depending on the sampling frequency). As shown, over one rotation of the platen, spectra are obtained from different radii on the substrate 10*a*. That is, some spectra are obtained from locations closer to the center of the substrate 10*a* and some are closer to the edge. Similarly, as shown by in FIG. 3B, due to the rotation of the platen, as the window travels below the other carrier head (e.g., the carrier head holding the second substrate 10*b*) the optical monitoring system making spectra measurements at the sampling frequency will cause the spectra measurements to be taken at locations 202 along an arc that traverses the second substrate 10*b*.

Thus, for any given rotation of the platen, based on timing and motor encoder information, the controller can determine which substrate, e.g., substrate 10*a* or 10*b*, is the source of the measured spectrum. In addition, for any given scan of the optical monitoring system across a substrate, e.g., substrate 10*a* or 10*b*, based on timing, motor encoder information, and optical detection of the edge of the substrate and/or retaining ring, the controller 190 can calculate the radial position (relative to the center of the particular substrate 10*a* or 10*b* being scanned) for each measured spectrum from the scan. The polishing system can also include a rotary position sensor, e.g., a flange attached to an edge of the platen that will pass through a stationary optical interrupter, to provide additional data for determination of which substrate and the position on the substrate of the measured spectrum. The controller can thus associate the various measured spectra with the controllable zones 148*b*-148*e* (see FIG. 2) on the substrates 10*a* and 10*b*. In some implementations, the time of measurement of the spectrum can be used as a substitute for the exact calculation of the radial position.

Over multiple rotations of the platen, for each zone of each substrate, a sequence of spectra can be obtained over time. Without being limited to any particular theory, the spectrum of light reflected from the substrate 10 evolves as polishing progresses (e.g., over multiple rotations of the platen, not during a single sweep across the substrate) due to changes in the thickness of the outermost layer, thus yielding a sequence of time-varying spectra. Moreover, particular spectra are exhibited by particular thicknesses of the layer stack.

In some implementations, the controller, e.g., the computing device can be programmed to compare a measured spectrum to multiple reference spectra to and determine which reference spectrum provides the best match. In particular, the controller can be programmed to compare each spectrum from a sequence of measured spectra from each zone of each substrate to multiple reference spectra to generate a sequence of best matching reference spectra for each zone of each substrate.

As used herein, a reference spectrum is a predefined spectrum generated prior to polishing of the substrate. A reference spectrum can have a pre-defined association, i.e., defined prior to the polishing operation, with a value representing a time in the polishing process at which the spectrum is expected to appear, assuming that the actual polishing rate follows an expected polishing rate. Alternatively or in addition, the reference spectrum can have a pre-defined association with a value of a substrate property, such as a thickness of the outermost layer.

A reference spectrum can be generated empirically, e.g., by measuring the spectra from a test substrate, e.g., a test substrate having a known initial layer thicknesses. For example, to generate a plurality of reference spectra, a set-up substrate is polished using the same polishing parameters that would be used during polishing of device wafers while a sequence of spectra are collected. For each spectrum, a value is recorded representing the time in the polishing process at which the spectrum was collected. For example, the value can be an elapsed time, or a number of platen rotations. The substrate can be overpolished, i.e., polished past a desired thickness, so that the spectrum of the light that reflected from the substrate when the target thickness is achieved can be obtained.

In order to associate each spectrum with a value of a substrate property, e.g., a thickness of the outermost layer, the initial spectra and property of a "set-up" substrate with the same pattern as the product substrate can be measured pre-polish at a metrology station. The final spectrum and property can also be measured post-polish with the same metrology station or a different metrology station. The properties for spectra between the initial spectra and final spectra can be determined by interpolation, e.g., linear interpolation based on elapsed time at which the spectra of the test substrate was measured.

In addition to being determined empirically, some or all of the reference spectra can be calculated from theory, e.g., using an optical model of the substrate layers. For example, an optical model can be used to calculate a reference spectrum for a given outer layer thickness D. A value representing the time in the polishing process at which the reference spectrum would be collected can be calculated, e.g., by assuming that the outer layer is removed at a uniform polishing rate. For example, the time Ts for a particular reference spectrum can be calculated simply by assuming a starting thickness D0 and uniform polishing rate R (Ts=(D0−D)/R). As another example, linear interpolation between measurement times T1, T2 for the pre-polish and post-polish thicknesses D1, D2 (or other thicknesses measured at the metrology station) based on the thickness D used for the optical model can be performed (Ts=T2−T1*(D1−D)/(D1−D2)).

Referring to FIGS. 4 and 5, a measured spectrum 300 (see FIG. 4) can be compared to reference spectra 320 from one or more libraries 310 (see FIG. 5). As used herein, a library of reference spectra is a collection of reference spectra which represent substrates that share a property in common. However, the property shared in common in a single library may vary across multiple libraries of reference spectra. For example, two different libraries can include reference spectra that represent substrates with two different underlying thicknesses. For a given library of reference spectra, variations in the upper layer thickness, rather than other factors (such as differences in wafer pattern, underlying layer thickness, or layer composition), can primarily responsible for the differences in the spectral intensities.

Reference spectra 320 for different libraries 310 can be generated by polishing multiple "set-up" substrates with different substrate properties (e.g., underlying layer thicknesses, or layer composition) and collecting spectra as discussed above; the spectra from one set-up substrate can provide a first library and the spectra from another substrate with a different underlying layer thickness can provide a second library. Alternatively or in addition, reference spectra for different libraries can be calculated from theory, e.g., spectra for a first library can be calculated using the optical model with the underlying layer having a first thickness, and spectra for a second library can be calculated using the optical model with the underlying layer having a different one thickness.

In some implementations, each reference spectrum 320 is assigned an index value 330. In general, each library 310 can include many reference spectra 320, e.g., one or more, e.g., exactly one, reference spectra for each platen rotation over the expected polishing time of the substrate. This index 330 can be the value, e.g., a number, representing the time in the polishing process at which the reference spectrum 320 is expected to be observed. The spectra can be indexed so that each spectrum in a particular library has a unique index value. The indexing can be implemented so that the index values are sequenced in an order in which the spectra were measured. An index value can be selected to change monotonically, e.g., increase or decrease, as polishing progresses. In particular, the index values of the reference spectra can be selected so that they form a linear function of time or number of platen rotations (assuming that the polishing rate follows that of the model or test substrate used to generate the reference spectra in the library). For example, the index value can be proportional, e.g., equal, to a number of platen rotations at which the reference spectra was measured for the test substrate or would appear in the optical model. Thus, each index value can be a whole number. The index number can represent the expected platen rotation at which the associated spectrum would appear.

The reference spectra and their associated index values can be stored in a reference library. For example, each reference spectrum 320 and its associated index value 330 can be stored in a record 340 of database 350. The database 350 of reference libraries of reference spectra can be implemented in memory of the computing device of the polishing apparatus.

As noted above, for each zone of each substrate, based on the sequence of measured spectra or that zone and substrate, the controller 190 can be programmed to generate a sequence of best matching spectra. A best matching reference spectrum can be determined by comparing a measured spectrum to the reference spectra from a particular library.

In some implementations, the best matching reference spectrum can be determined by calculating, for each reference spectra, a sum of squared differences between the measured spectrum and the reference spectrum. The reference spectrum with the lowest sum of squared differences has the best fit. Other techniques for finding a best matching reference spectrum are possible.

A method that can be applied to decrease computer processing is to limit the portion of the library that is searched for matching spectra. The library typically includes a wider range of spectra than will be obtained while polishing a substrate. During substrate polishing, the library searching is limited to a predetermined range of library spectra. In some embodiments, the current rotational index N of a substrate being polished is determined. For example, in an initial platen rotation, N can be determined by searching all of the reference spectra of the library. For the spectra obtained during a subsequent rotation, the library is searched within a range of freedom of N. That is, if during one rotation the index number is found to be N, during a subsequent rotation which is X rotations later, where the freedom is Y, the range that will be searched from (N+X)−Y to (N+X)+Y.

Figure 6:
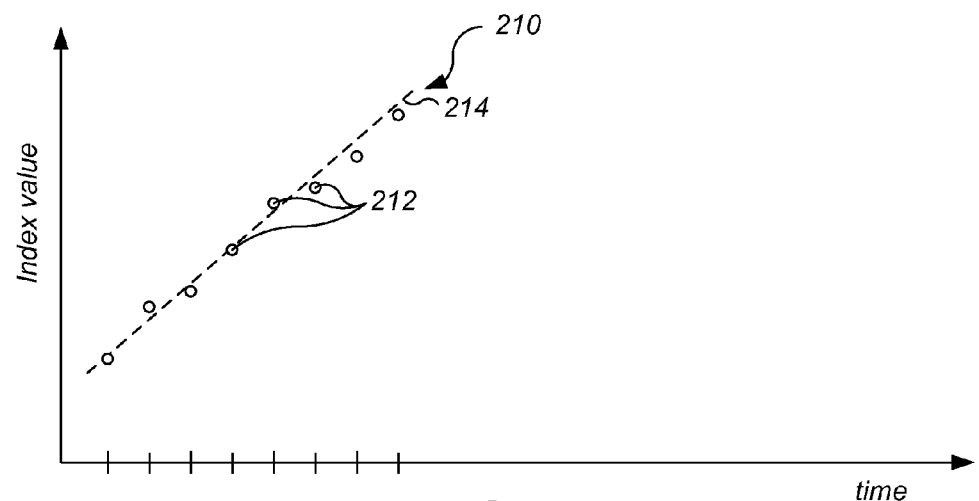
FIG. 6 illustrates an index trace.

Referring to FIG. 6, which illustrates the results for only a single zone of a single substrate, the index value of each of the best matching spectra in the sequence can be determined to generate a time-varying sequence of index values 212. This sequence of index values can be termed an index trace 210. In some implementations, an index trace is generated by comparing each measured spectrum to the reference spectra from exactly one library. In general, the index trace 210 can include one, e.g., exactly one, index value per sweep of the optical monitoring system below the substrate.

For a given index trace 210, where there are multiple spectra measured for a particular substrate and zone in a single sweep of the optical monitoring system (termed "current spectra"), a best match can be determined between each of the current spectra and the reference spectra of one or more, e.g., exactly one, library. In some implementations, each selected current spectra is compared against each reference spectra of the selected library or libraries. Given current spectra e, f, and g, and reference spectra E, F, and G, for example, a matching coefficient could be calculated for each of the following combinations of current and reference spectra: e and E, e and F, e and G, f and E, f and F, f and G, g and E, g and F, and g and G. Whichever matching coefficient indicates the best match, e.g., is the smallest, determines the best-matching reference spectrum, and thus the index value. Alternatively, in some implementations, the current spectra can be combined, e.g., averaged, and the resulting combined spectrum is compared against the reference spectra to determine the best match, and thus the index value.

In some implementations, for at least some zones of some substrates, a plurality of index traces can be generated. For a given zone of a given substrate, an index trace can be generated for each reference library of interest. That is, for each reference library of interest to the given zone of the given substrate, each measured spectrum in a sequence of measured spectra is compared to reference spectra from a given library, a sequence of the best matching reference spectra is determined, and the index values of the sequence of best matching reference spectra provide the index trace for the given library.

In summary, each index trace includes a sequence 210 of index values 212, with each particular index value 212 of the sequence being generated by selecting the index of the reference spectrum from a given library that is the closest fit to the measured spectrum. The time value for each index of the index trace 210 can be the same as the time at which the measured spectrum was measured.

Figure 7:
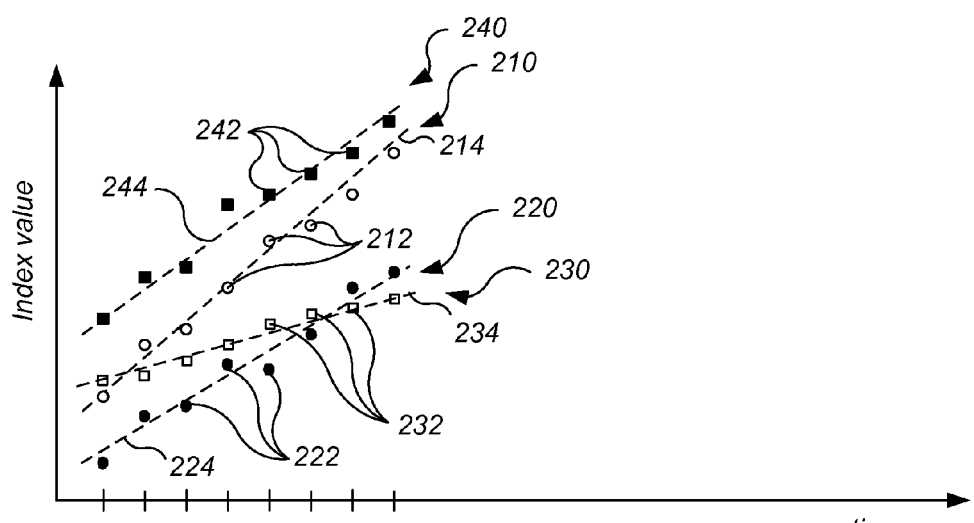
FIG. 7 illustrates a plurality of index traces for different zones of different substrates.

Referring to FIG. 7, a plurality of index traces is illustrated. As discussed above, an index trace can be generated for each zone of each substrate. For example, a first sequence 210 of index values 212 (shown by hollow circles) can be generated for a first zone of a first substrate, a second sequence 220 of index values 222 (shown by solid circles) can be generated for a second zone of the first substrate, a third sequence 230 of index values 232 (shown by hollow squares) can be generated for a first zone of a second substrate, and a fourth sequence 240 of index values 242 (shown by solid squares) can be generated for a second zone of the second substrate.

As shown in FIG. 7, for each substrate index trace, a polynomial function of known order, e.g., a first-order function (e.g., a line) is fit to the sequence of index values for the associated zone and wafer, e.g., using robust line fitting. For example, a first line 214 can be fit to index values 212 for the first zone of the first substrate, a second line 224 can be fit to the index values 222 of the second zone of the first substrate, a third line 234 can be fit to the index values 232 of the first zone of the second substrate, and a fourth line 244 can be fit to the index values 242 of the second zone of the second substrate. Fitting of a line to the index values can include calculation of the slope S of the line and an x-axis intersection time T at which the line crosses a starting index value, e.g., 0. The function can be expressed in the form $I(t)=S \cdot (t-T)$, where t is time. The x-axis intersection time T can have a negative value, indicating that the starting thickness of the substrate layer is less than expected. Thus, the first line 214 can have a first slope S1 and a first x-axis intersection time T1, the second line 224 can have a second slope S2 and a second x-axis intersection time T2, the third line 234 can have a third slope S3 and a third x-axis intersection time T3, and the fourth line 244 can have a fourth slope S4 and a fourth x-axis intersection time T4.

At some during the polishing process, e.g., at a time T0, a polishing parameter for at least one zone of at least one substrate, e.g., at least one zone of every substrate, is adjusted to adjust the polishing rate of the zone of the substrate such that at a polishing endpoint time, the plurality of zones of the plurality of substrates are closer to their target thickness than without such adjustment. In some embodiments, each zone of the plurality of substrates can have approximately the same thickness at the endpoint time.

Figure 8:
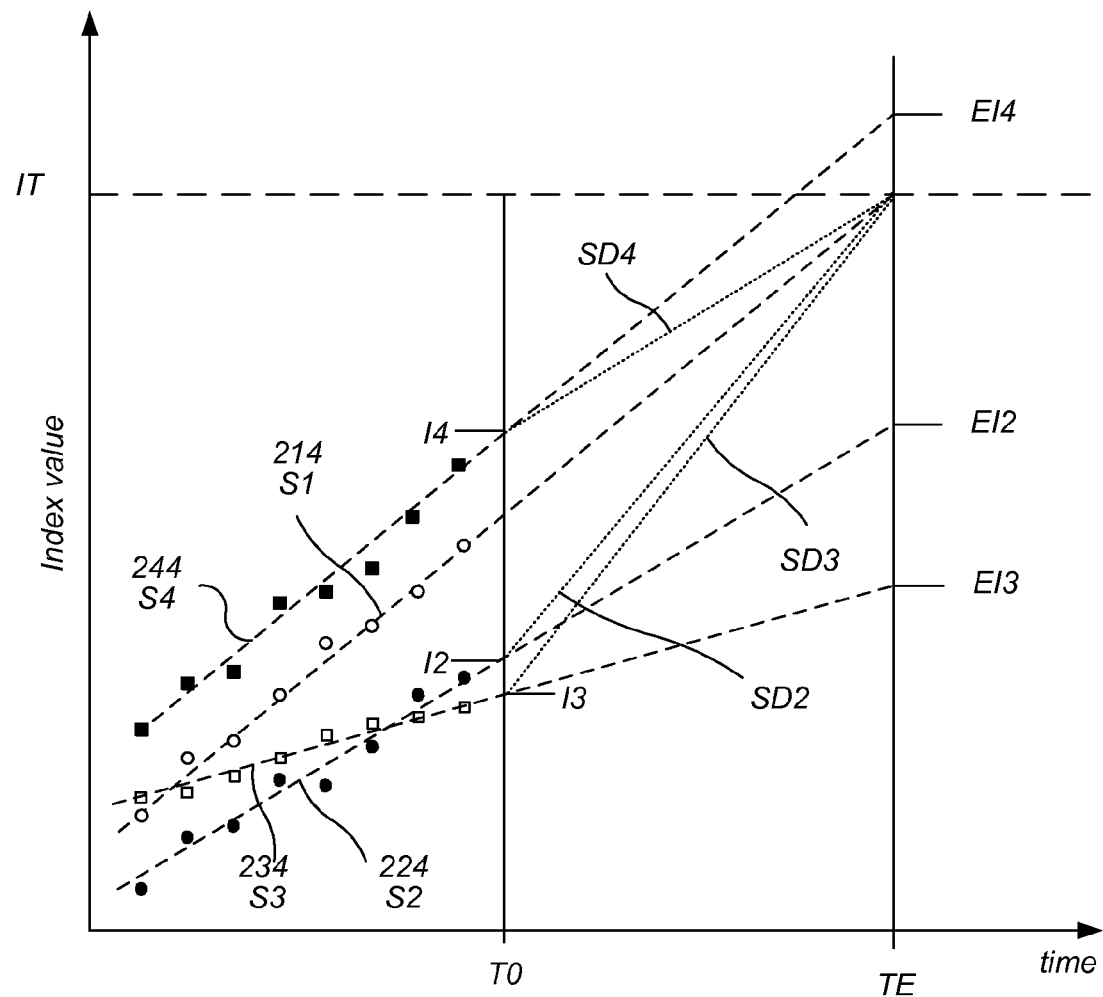
FIG. 8 illustrates a calculation of a plurality of desired slopes for a plurality of adjustable zones based on a time that an index trace of a reference zone reaches a target index.

Referring to FIG. 8, in some implementations, one zone of one substrate is selected as a reference zone, and a projected endpoint time TE at which the reference zone will reach a target index IT is determined. For example, as shown in FIG. 8, the first zone of the first substrate is selected as the reference zone, although a different zone and/or a different substrate could be selected. The target thickness IT is set by the user prior to the polishing operation and stored.

In order to determine the projected time at which the reference zone will reach the target index, the intersection of the line of the reference zone, e.g., line 214, with the target index, IT, can be calculated. Assuming that the polishing rate does not deviate from the expected polishing rate through the remainder polishing process, then the sequence of index values should retain a substantially linear progression. Thus, the expected endpoint time TE can be calculated as a simple linear interpolation of the line to the target index IT, e.g., $IT=S \cdot (TE-T)$. Thus, in the example of FIG. 8 in which the first zone of the second substrate is selected as the reference zone, with associated third line 234, $IT=S1 \cdot (TE-T1)$, i.e., $TE=IT/S1-T1$.

One or more zones, e.g., all zones, other than the reference zone (including zones on other substrates) can be defined as adjustable zones. Where the lines for the adjustable zones meet the expected endpoint time TE define projected endpoint for the adjustable zones. The linear function of each adjustable zone, e.g., lines 224, 234 and 244 in FIG. 8, can thus be used to extrapolate the index, e.g., EI2, EI3 and EI4, that will be achieved at the expected endpoint time TE for the associated zone. For example, the second line 224 can be used to extrapolate the expected index, EI2, at the expected endpoint time TE for the second zone of the first substrate, the third line 234 can be used to extrapolate the expected index, EI3, at the expected endpoint time TE for the first zone of the second substrate, and the fourth line can be used to extrapolate the expected index, EI4, at the expected endpoint time TE for the second zone of the second substrate.

As shown in FIG. 8, if no adjustments are made to the polishing rate of any of the zones of any the substrates after time T0, then if endpoint is forced at the same time for all substrates, then each substrate can have a different thickness, or each substrate could have a different endpoint time (which is not desirable because it can lead to defects and loss of throughput). Here, for example, the second zone of the first substrate (shown by line 224) would endpoint at an expected index EI2 greater (and thus a thickness less) than the expected index of the first zone of the first substrate. Likewise, the first zone of the second substrate would endpoint at an expected index EI3 less (and thus a thickness greater) than the first zone of the first substrate.

If, as shown in FIG. 8, the target index will be reached at different times for different substrates (or equivalently, the adjustable zones will have different expected indexes at the projected endpoint time of reference zone), the polishing rate can be adjusted upwardly or downwardly, such that the substrates would reach the target index (and thus target thickness) closer to the same time than without such adjustment, e.g., at approximately the same time, or would have closer to the same index value (and thus same thickness), at the target time than without such adjustment, e.g., approximately the same index value (and thus approximately the same thickness).

Thus, in the example of FIG. 8, commencing at a time T0, at least one polishing parameter for the second zone of the first substrate is modified so that the polishing rate of the zone is increased (and as a result the slope of the index trace 224 is increased). Also, in this example, at least one polishing parameter for the first zone of the second substrate is modified so that the polishing rate of the zone is increased (and as a result the slope of the index trace 234 is increased). Similarly, in this example, at least one polishing parameter for the second zone of the second substrate is modified so that the polishing rate of the zone is decreased (and as a result the slope of the index trace 244 is decreased). As a result, both zones of both substrates would reach the target index (and thus the target thickness) at approximately the same time (or if polishing of both substrates halts at the same time, both zones of both substrates will end with approximately the same thickness).

In some implementations, if the projected index at the expected endpoint time ET indicate that a zone of the substrate is within a predefined range of the target thickness, then no adjustment may be required for that zone. The range may be 2%, e.g., within 1%, of the target index.

The polishing rates for the adjustable zones can be adjusted so that all of the zones are closer to the target index at the expected endpoint time than without such adjustment. For example, a reference zone of the reference substrate might be chosen and the processing parameters for all of the other zone adjusted such that all of the zones will endpoint at approximately the projected time of the reference substrate. The reference zone can be, for example, a predetermined zone, e.g., the center zone 148a or the zone 148b immediately surrounding the center zone, the zone having the earliest or latest projected endpoint time of any of the zones of any of the substrates, or the zone of a substrate having the desired projected endpoint. The earliest time is equivalent to the thinnest substrate if polishing is halted at the same time. Likewise, the latest time is equivalent to the thickest substrate if polishing is halted at the same time. The reference substrate can be, for example, a predetermined substrate, a substrate having the zone with the earliest or latest projected endpoint time of the substrates. The earliest time is equivalent to the thinnest zone if polishing is halted at the same time. Likewise, the latest time is equivalent to the thickest zone if polishing is halted at the same time.

For each of the adjustable zones, a desired slope for the index trace can be calculated such that the adjustable zone reaches the target index at the same time as the reference zone. For example, the desired slope SD can be calculated from (IT−I)=SD*(TE−T0), where I is the index value (calculated from the linear function fit to the sequence of index values) at time T0 polishing parameter is to be changed, IT is the target index, and TE is the calculated expected endpoint time. In the example of FIG. 8, for the second zone of the first substrate, the desired slope SD2 can be calculated from (IT−I2)=SD2*(TE−T0), for the first zone of the second substrate, the desired slope SD3 can be calculated from (IT−I3)=SD3*(TE−T0), and for the second zone of the second substrate, the desired slope SD4 can be calculated from (IT−I4)=SD4*(TE−T0).

Figure 9:
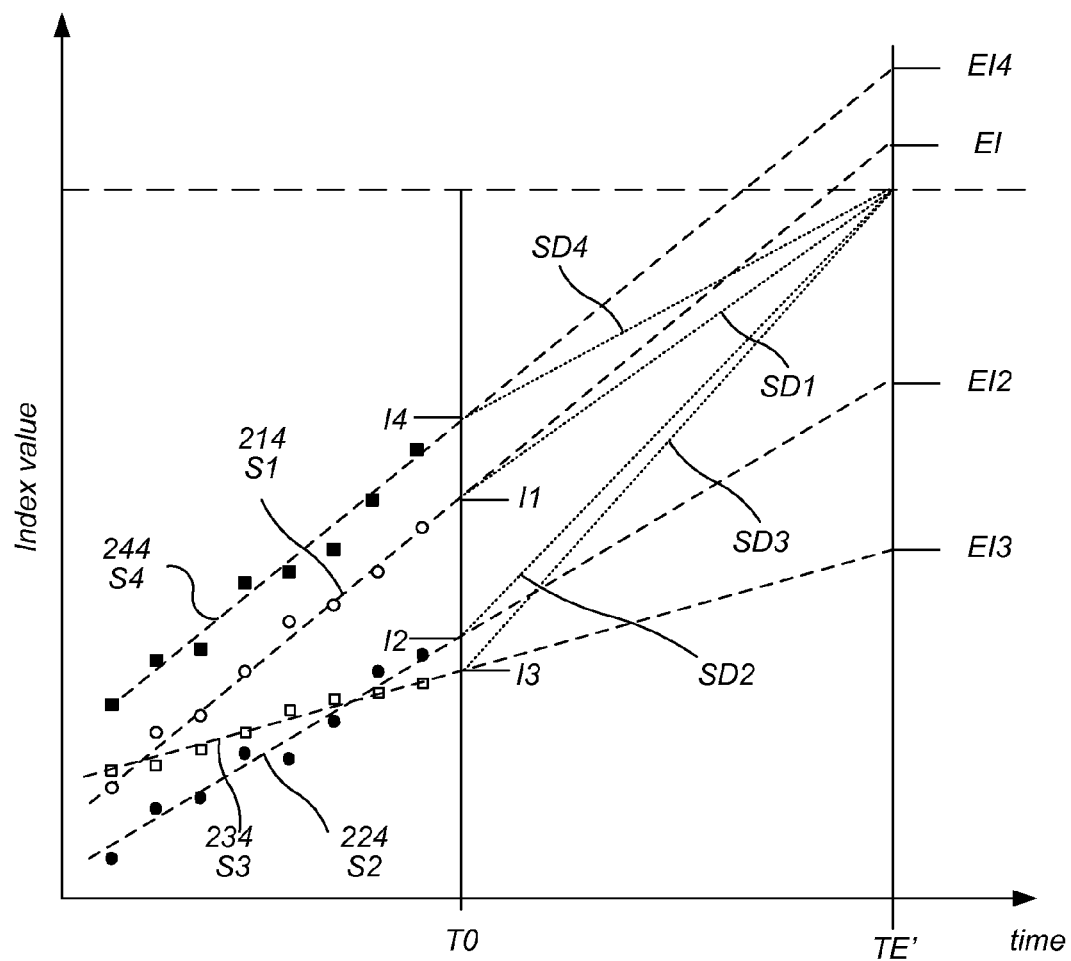
FIG. 9 illustrates a calculation of a plurality of desired slopes for a plurality of adjustable zones based on a time that an index trace of a reference zone reaches a target index.

Referring to FIG. 9, in some implementations, there is no reference zone. For example, the expected endpoint time TE' can be a predetermined time, e.g., set by the user prior to the polishing process, or can be calculated from an average or other combination of the expected endpoint times of two or more zones (as calculated by projecting the lines for various zones to the target index) from one or more substrates. In this implementation, the desired slopes are calculated substantially as discussed above (using the expected endpoint time TE' rather than TE), although the desired slope for the first zone of the first substrate must also be calculated, e.g., the desired slope SD1 can be calculated from (IT−I1)=SD1*(TE'−T0).

Figure 10:
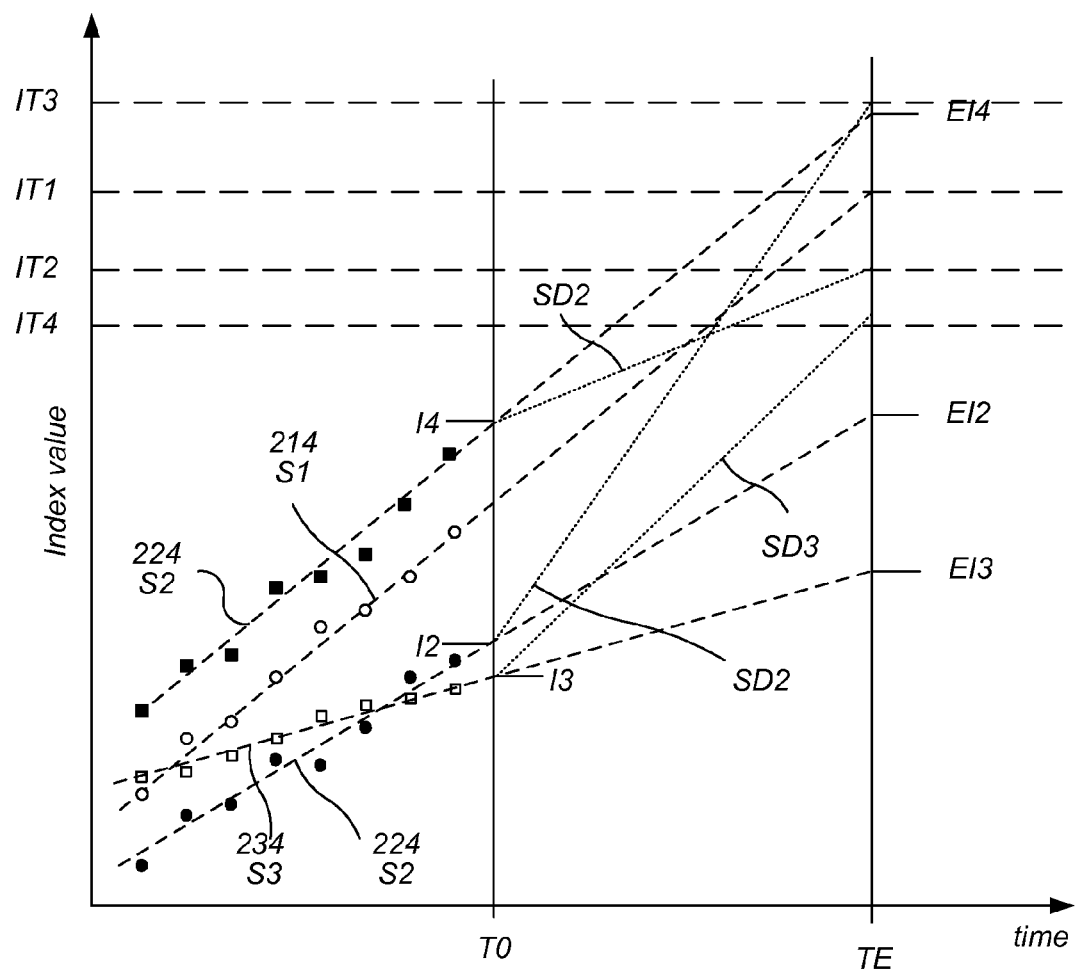
FIG. 10 illustrates a plurality of index traces for different zones of different substrates, with different zones having different target indexes.

Referring to FIG. 10, in some implementations, (which can also be combined with the implementation shown in FIG. 9), there are different target indexes for different zones. This permits the creation of a deliberate but controllable non-uniform thickness profile on the substrate. The target indexes can be entered by user, e.g., using an input device on the controller. For example, the first zone of the first substrate can have a first target indexes IT1, the second zone of the first substrate can have a second target indexes IT2, the first zone of the second substrate can have a third target indexes IT3, and the second zone of the second substrate can have a fourth target indexes IT4.

The desired slope SD for each adjustable zone can be calculated from (IT−I)=SD*(TE−T0), where I is the index value of the zone (calculated from the linear function fit to the sequence of index values for the zone) at time T0 at which the polishing parameter is to be changed, IT is the target index of the particular zone, and TE is the calculated expected endpoint time (either from a reference zone as discussed above in relation to FIG. 8, or from a preset endpoint time or from a combination of expected endpoint times as discussed above in relation to FIG. 9). In the example of FIG. 10, for the second zone of the first substrate, the desired slope SD2 can be calculated from (IT2−I2)=SD2*(TE−T0), for the first zone of the second substrate, the desired slope SD3 can be calculated from (IT3−I3)=SD3*(TE−T0), and for the second zone of the second substrate, the desired slope SD4 can be calculated from (IT4−I4)=SD4*(TE−T0).

For any of the above methods described above for FIGS. 8-10, the polishing rate is adjusted to bring the slope of index trace closer to the desired slope. The polishing rates can be adjusted by, for example, increasing or decreasing the pressure in a corresponding chamber of a carrier head. The change in polishing rate can be assumed to be directly proportional to the change in pressure, e.g., a simple Prestonian model. For example, for each zone of each substrate, where zone was polished with a pressure Pold prior to the time T0, a new pressure Pnew to apply after time T0 can be calculated as Pnew=Pold*(SD/S), where S is the slope of the line prior to time T0 and SD is the desired slope.

For example, assuming that pressure Pold1 was applied to the first zone of the first substrate, pressure Pold2 was applied to the second zone of the first substrate, pressure Pold3 was applied to the first zone of the second substrate, and pressure Pold4 was applied to the Second zone of the second substrate, then new pressure Pnew1 for the first zone of the first substrate can be calculated as Pnew1=Pold1*(SD1/S1), the new pressure Pnew2 for the second zone of the first substrate clan be calculated as Pnew2=Pold2*(SD2/S2), the new pressure Pnew3 for the first zone of the second substrate clan be calculated as Pnew3=Pold3*(SD3/S3), and the new pressure Pnew4 for the second zone of the second substrate clan be calculated as Pnew4=Pold4*(SD4/S4).

The process of determining projected times that the substrates will reach the target thickness, and adjusting the polishing rates, can be performed just once during the polishing process, e.g., at a specified time, e.g., 40 to 60% through the expected polishing time, or performed multiple times during the polishing process, e.g., every thirty to sixty seconds. At a subsequent time during the polishing process, the rates can again be adjusted, if appropriate. During the polishing process, changes in the polishing rates can be made only a few times, such as four, three, two or only one time. The adjustment can be made near the beginning, at the middle or toward the end of the polishing process.

Polishing continues after the polishing rates have been adjusted, e.g., after time T0, and the optical monitoring system continues to collect spectra and determine index values for each zone of each substrate. Once the index trace of a reference zone reaches the target index (e.g., as calculated by fitting a new linear function to the sequence of index values after time T0 and determining the time at which the new linear function reaches the target index), endpoint is called and the polishing operation stops for both substrates. The reference zone used for determining endpoint can be the same reference zone used as described above to calculate the expected endpoint time, or a different zone (or if all of the zones were adjusted as described with reference to FIG. 8, then a reference zone can be selected for the purpose of endpoint determination).

In some implementations, e.g., for copper polishing, after detection of the endpoint for a substrate, the substrate is immediately subjected to an overpolishing process, e.g., to remove copper residue. The overpolishing process can be at a uniform pressure for all zones of the substrate, e.g., 1 to 1.5 psi. The overpolishing process can have a preset duration, e.g., 10 to 15 seconds.

In some implementations, polishing of the substrates does not halt simultaneously. In such implementations, for the purpose of the endpoint determination, there can be a reference zone for each substrate. Once the index trace of a reference zone of a particular substrate reaches the target index (e.g., as calculated by the time the linear function fit the sequence of index values after time T0 reaches the target index), endpoint is called for the particular substrate and application of pressure to all zones of the particular is halted simultaneously. However, polishing of one or more other substrates can continue. Only after endpoint has been called for the all of the remaining substrates (or after overpolishing has been completed for all substrates), based on the reference zones of the remaining substrates, does rinsing of the polishing pad commence. In addition, all of the carrier heads can lift the substrates off the polishing pad simultaneously.

In some implementations, multiple libraries (e.g., libraries 310) can be used for each zone. The multiple libraries can be particularly suitable, for example, for monitoring of polishing at or near the edges of the substrate, where polishing rates and processes may be non-linear. The libraries used for each zone can be selected by a user, for example, based on knowledge of satisfactory results of polishing similar zones using specific libraries. As such, a user can select one subset of libraries for one zone, a second subset of libraries for another zone, and so on. The reference spectra from each library can be used in matching the measured spectra during polishing, and each reference spectrum can have an associated index value as described above.

Figure 11:
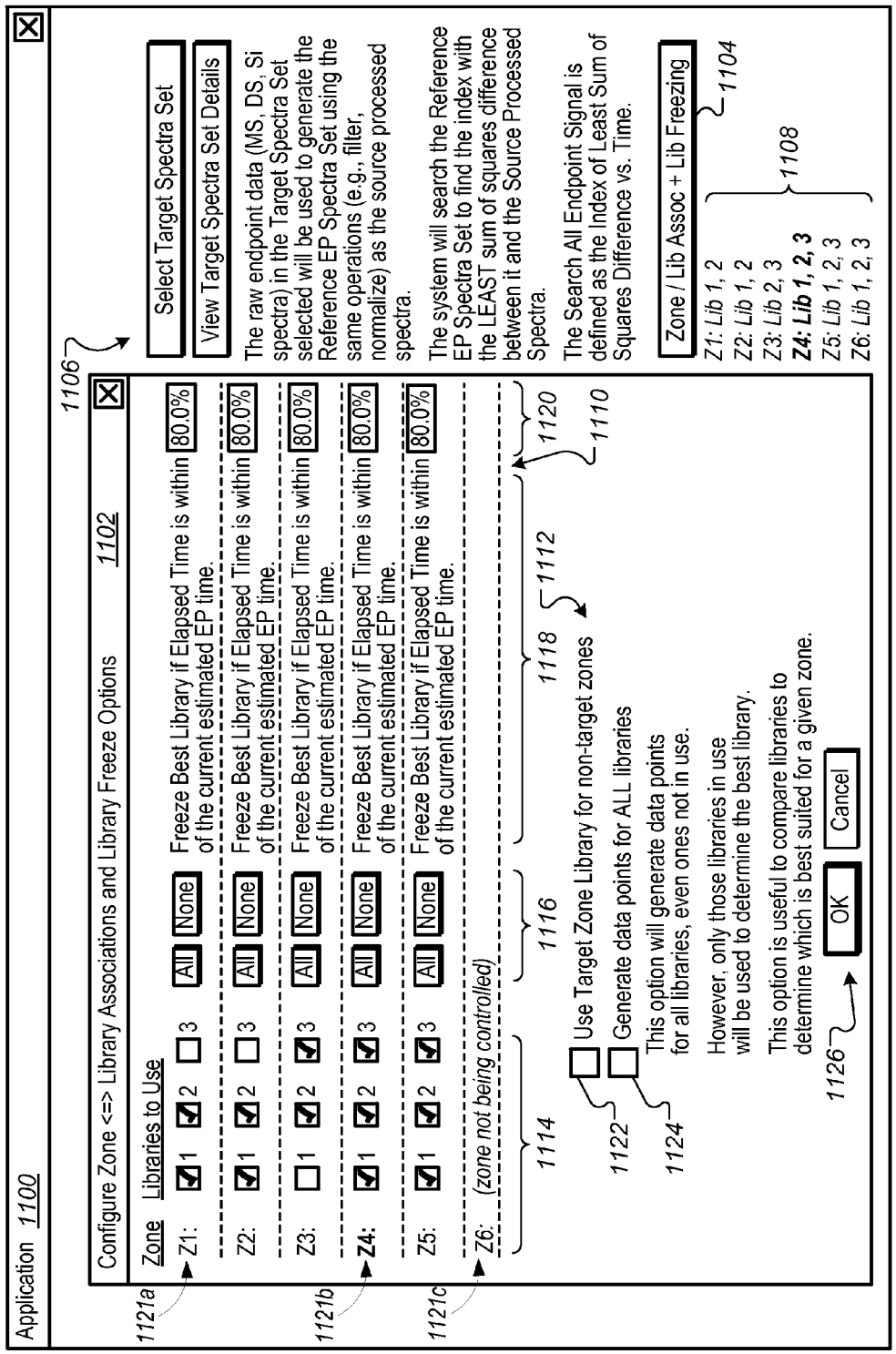
FIG. 11 illustrates an example user interface for selecting reference libraries used for different zones.

FIG. 11 illustrates an example user interface 1100 for selecting reference libraries used for different zones. The user interface 1100 can be included with computer software that interfaces with the polishing apparatus 100. As an example, the user of the user interface 1100 (e.g., the person controlling the polishing apparatus 100) can select, for each zone, multiple libraries, e.g., libraries 310 as described above with reference to FIG. 5. Based on the libraries selected, for example, the polishing apparatus 100 can dynamically adjust the polishing pressures and times for various zones during the polishing process. By selecting different libraries, for example, the polishing apparatus 100 can compensate for nonlinear results that are otherwise typical at the edges of the wafer. For example, along the edge of a wafer, processes associated with robust line fitting (described with respect to FIG. 7) using a single reference zone can provide less than adequate results. By selecting specific libraries at the edge of the wafer, for instance, the polishing process can be improved by using libraries associated with similar edge properties.

The multiple libraries selected using the user interface 1100 can allow each polishing head to use its own library spectra set that best describes the polishing behavior in that zone. The robust line fit to the best-matched library indices for each zone can then have a better goodness of fit to indices. Each zone can have its own target index, and the controller 190 can adjust the pressures dynamically to achieve the target index of each zone at endpoint. This concept can be extended to dealing with underlying variations resulting from upstream wafer processing that is specific to a region of the wafer. By assigning different reference spectra sets per zone or region of the wafer, improved accuracy can occur for the robust line fit for each zone.

The user interface 1100 can include an initial library selection control, e.g., a drop-down menu or browsing window, that permits a user to select a plurality of libraries.

The user interface 1100 includes a library selection window 1102 that can be used to independently select one or more libraries (out of the plurality of libraries previously identified with the initial library selection dialog) to use for each zone. As an example, the library selection window 1102 can be a pop-up window that appears after selecting a zone library association control 1104 which can be used to associate and freeze libraries for zones. The zone library association control 1104 can be included with various other controls 1106 (e.g., buttons, fields, check boxes, etc.) to which the user has access and which, for example, provide user controls for other aspects of the polishing process. At any given time, a zone libraries summary 1108 can provide a summary of the information currently defined by the library selection screen 1102, such as at times when the library selection window 1102 is not displayed. In some implementations, the zone libraries summary 1108 can be provided in a scrollable list (e.g., with scroll bars included), such as if the number of zones to be displayed exceeds the display area assigned for the zone libraries summary 1108.

The library selection window 1102 can include two main areas, including a library selection area 1110 for assigning libraries to specific numbered zones, and an options area 1112 for specifying how zones and options are to be used. As shown in FIG. 11, the library selection window 1102 includes zone-specific library check boxes 1114, all/none controls 1116, freeze check boxes 1118 and percentage fields 1120. A user can select (or de-select) individual libraries (e.g., libraries 1, 2 and/or 3) by checking (or un-checking) the checkbox next to each library number.

For example, a first row 1121*a* for the zone Z1 shows libraries 1 and 2 selected, while a highlighted row 1121*b* for the zone Z4 shows all three libraries 1, 2, 3 selected. These and other selections are summarized in the zone libraries summary 1108, which also shows the information for zone Z4 highlighted. In some implementations, the user interface 1100 can highlight the row (e.g., 1121*a*, 1121*b*, etc.) on which the user is currently operating. As shown, none of the rows (e.g., rows 1121*a*, 1121*b*, etc.) have the freeze check boxes 1118 checked. Row 1121*c* identifies a zone Z6 which is not currently being controlled in the polishing process. In some implementations, selecting or clicking on an un-controlled zone name (e.g., Z6) can enable the controls 1114 through 1120 for the zone, allowing the user to select libraries to use for the zone and make other selections.

In some implementations, as noted above, the libraries displayed as selectable candidate libraries for each zone can be controlled using a drop-down menu, browsing dialog, or other control, which is not shown in FIG. 11. For example, using such a control, the user can add library 4 and/or other libraries that do not currently appear in the zone-specific library check boxes 1114.

In some implementations, other controls not shown in FIG. 11 allow the user to define or display information about each library. For example, the user can write notes about the characteristics of a library and later pull up the information for that library, such as when deciding upon which libraries to assign as usable for a specific zone.

The all/none buttons 1116 can be provide the user with a quick method for either checking all of the library check boxes (e.g., using the "All" button) or un-checking all of the check boxes (e.g., using the "None" button). For example, the checked states of the checked boxes for zone Z4 in the row 1121*b* can be the result of the user selecting the "All" button on that row.

Freeze check boxes 1118 allow the user to control timing of the automatic selection of the library that provides the best fit. In particular, if, during polishing, the elapsed time is within a specified percentage (e.g., as specified in each percentage field 1120), then the library that provides the linear function with the best goodness of fit is selected and used for the remainder of the polishing process. If the freeze check box 1118 is not selected for a specific zone, then the percentage field 1120 can be grayed-out or otherwise disabled.

The target zone check box 1122 causes the system to use the best library for the reference zone for all of the adjustable zones.

The generate check box 1124 can be used as a tool to aid the operator in determining the best libraries to use for each specific zone. In some implementations, the user interface 1100 can include a display (not shown in FIG. 11) that shows the index values and the linear function generated from the best library as polishing progresses in real time. However, if the check box 1124 is checked, then a display is generated showing the index values and the linear function generated for each reference library that has been selected for a given zone. This permits libraries that function poorly for a given zone to also be displayed at the user's option. The user can use this type of best/worst library information, for example, to decide which libraries to use (or to avoid) when checking individual zone-specific library check boxes 1114.

Controls 1126, shown here as including an OK button and a Cancel button, can allow the user to either commit or discard user inputs or changes made on the library selection window 1102. As an example, selecting (e.g., clicking on) the OK button can apply any inputs that the user has made in the library selection area 1110 and option selections made in the options area 1112. By comparison, selecting the Cancel button can allow the user to exit the library selection window 1102.

Using the multiple libraries that are selected by the user for each of the zones, the polishing apparatus 100 can measure a first sequence of spectra from the first zone of the substrate during the polishing process. For each measured spectrum in the first sequence of spectra from the first zone, and for each library associated with the first zone, the polishing apparatus 100 can determine a best matching reference spectrum. For each best matching reference spectrum from each library for the zone, the polishing apparatus 100 can determine a sequence of index values for use during the polishing process. This process can be repeated for the remaining zones using the multiple libraries defined for each zone.

Where multiple index traces are generated for a particular zone and substrate, e.g., one index trace for each library of interest to the particular zone and substrate, then one of the index traces can be selected for use in the endpoint or pressure control algorithm for the particular zone and substrate. For example, the each index trace generated for the same zone and substrate, the controller 190 can fit a linear function to the index values of that index trace, and determine a goodness of fit of the that linear function to the sequence of index values. The index trace generated having the line with the best goodness of fit its own index values can be selected as the index trace for the particular zone and substrate. For example, when determining how to adjust the polishing rates of the adjustable zones, e.g., at time T0, the linear function with the best goodness of fit can be used in the calculation. As another example, endpoint can be called when the calculated index (as calculated from the linear function fit to the sequence of index values) for the line with the best goodness of fit matches or exceeds the target index. Also, rather than calculating an index value from the linear function, the index values themselves could be compared to the target index to determine the endpoint.

Determining whether an index trace associated with a spectra library has the best goodness of fit to the linear function associated with the library can include determining whether the index trace of the associated spectra library has the least amount of difference from the associated robust line, relatively, as compared to the differences from the associated robust line and index trace associated with another library, e.g., the lowest standard deviation, the greatest correlation, or other measure of variance. In one implementation, the goodness of fit is determined by calculating a sum of squared differences between the index data points and the linear function; the library with the lowest sum of squared differences has the best fit.

Figure 12:
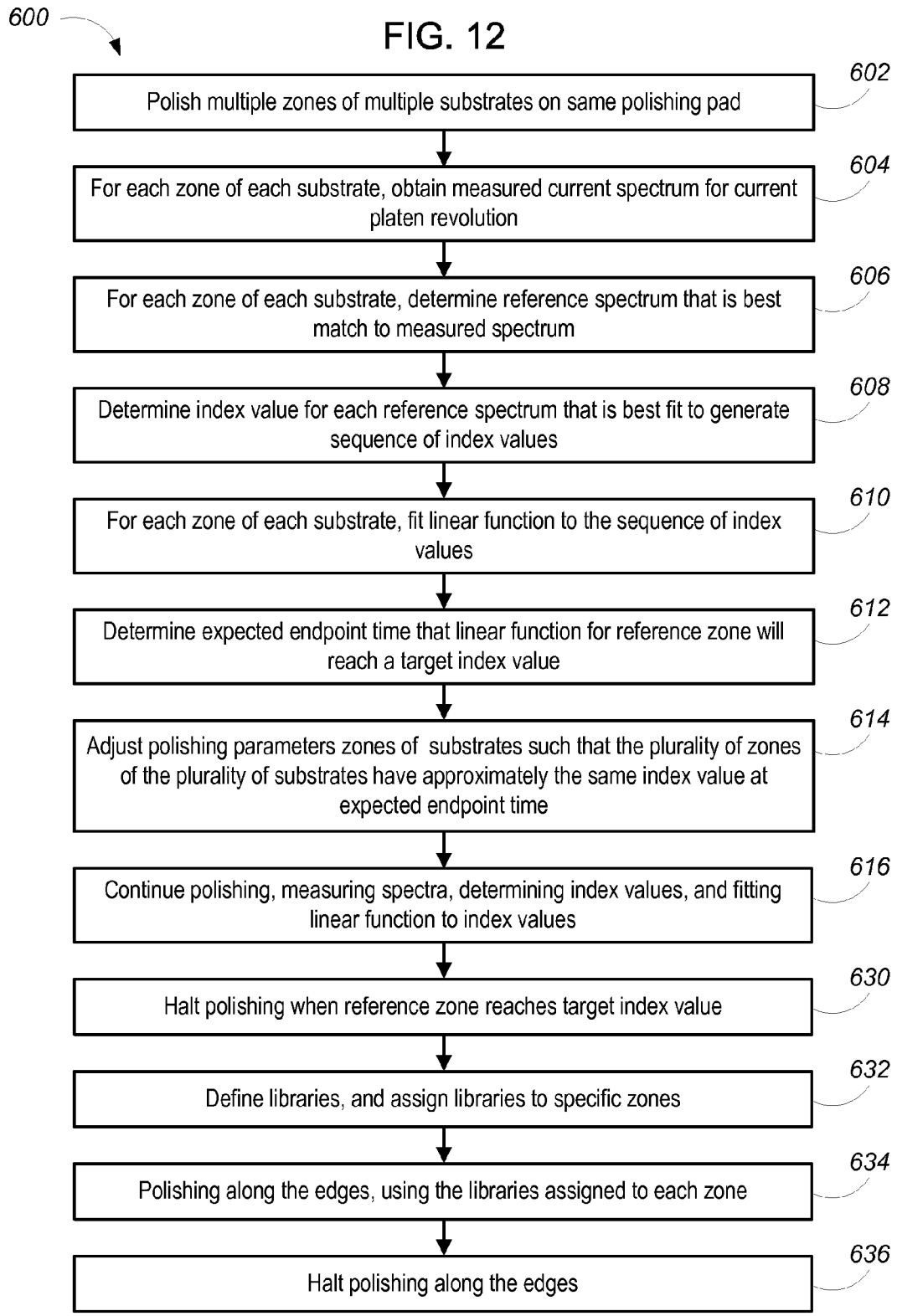
FIG. 12 is a flow diagram of an example process for adjusting the polishing rate of a plurality of zones in a plurality of substrates such that the plurality of zones have approximately the same thickness at the target time.

Referring to FIG. 12, a summary flow chart 600 is illustrated. A plurality of zones of a plurality of substrates are polished in a polishing apparatus simultaneously with the same polishing pad (step 602), as described above. During this polishing operation, each zone of each substrate has its polishing rate controllable independently of the other substrates by an independently variable polishing parameter, e.g., the pressure applied by the chamber in carrier head above the particular zone. During the polishing operation, the substrates are monitored (step 604) as described above, e.g., with a measured spectrum obtained from each zone of each substrate. The reference spectrum that is the best match is determined (step 606). The index value for each reference spectrum that is the best fit is determined to generate sequence of index values (step 610). For each zone of each substrate, a linear function is fit to the sequence of index values (step 610). In one implementation, an expected endpoint time that the linear function for a reference zone will reach a target index value is determined, e.g., by linear interpolation of the linear function (step 612). In other implementations, the expected endpoint time is predetermined or calculated as a combination of expected endpoint times of multiple zones. If needed, the polishing parameters for the other zones of the other substrates are adjusted to adjust the polishing rate of that substrate such that the plurality of zones of the plurality of substrates reach the target thickness at approximately the same time or such that the plurality of zones of the plurality of substrates have approximately the same thickness (or a target thickness) at the target time (step 614). Polishing continues after the parameters are adjusted, and for each zone of each substrate, measuring a spectrum, determining the best matching reference spectrum from a library, determining the index value for the best matching spectrum to generate a new sequence of index values for the time period after the polishing parameter has been adjusted, and fitting a linear function to index values (step 616). Polishing can be halted once the index value for a reference zone (e.g., a calculated index value generated from the linear function fit to the new sequence of index values) reaches target index (step 630).

Polishing in zones along the edges of the substrate can use processes as described above (e.g., steps 602 through 616). In addition, polishing along the edges can include the definition of libraries and assignment of the libraries to specific zones (step 632). For example, the libraries (e.g., libraries 310) can be defined. Furthermore, the libraries can be assigned to each zone, for example, using a user interface 1100 to assign one or more libraries (e.g., libraries 1, 2, 3, etc.) to specific zones (e.g., zones Z1, Z2, etc.). Polishing along the edges occurs, using the libraries assigned to each zone (step 634). Polishing can be halted (step 636) as done for step 630, such as when the index value for a zone reaches a target index. In some implementations, the steps 632 through 636 can be performed in parallel to steps 602 through 630, or in any order that is performable by the polishing apparatus 100.

The techniques described above can also be applicable for monitoring of metal layers using an eddy current system. In this case, rather than performing matching of spectra, the layer thickness (or a value representative thereof) is measured directly by the eddy current monitoring system, and the layer thickness is used in place of the index value for the calculations.

The method used to adjust endpoints can be different based upon the type of polishing performed. For copper bulk polishing, a single eddy current monitoring system can be used. For copper-clearing CMP with multiple wafers on a single platen, a single eddy current monitoring system can first be used so that all of the substrates reach a first breakthrough at the same time. The eddy current monitoring system can then be switched to a laser monitoring system to clear and overpolish the wafers. For barrier and dielectric CMP with multiple wafers on a single platen, an optical monitoring system can be used.

The controller 190 can include a central processing unit (CPU) 192, a memory 194, and support circuits 196, e.g., input/output circuitry, power supplies, clock circuits, cache, and the like. In addition to receiving signals from the optical monitoring system 160 (and any other endpoint detection system 180), the controller 190 can be connected to the polishing apparatus 100 to control the polishing parameters, e.g., the various rotational rates of the platen(s) and carrier head(s) and pressure(s) applied by the carrier head. The memory is connected to the CPU 192. The memory, or computable readable medium, can be one or more readily available memory such as random access memory (RAM), read only memory (ROM), floppy disk, hard disk, or other form of digital storage. In addition, although illustrated as a single computer, the controller 190 could be a distributed system, e.g., including multiple independently operating processors and memories.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a machine-readable storage media, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The above described polishing apparatus and methods can be applied in a variety of polishing systems. Either the polishing pad, or the carrier heads, or both can move to provide relative motion between the polishing surface and the substrate. For example, the platen may orbit rather than rotate. The polishing pad can be a circular (or some other shape) pad secured to the platen. Some aspects of the endpoint detection system may be applicable to linear polishing systems, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used; it should be understood that the polishing surface and substrate can be held in a vertical orientation or some other orientation.

Particular embodiments of the invention have been described. Other embodiments are within the scope of the following claims.

What is claimed is:

1. A method of configuring a polishing monitoring system, comprising:
   prior to polishing of a substrate, receiving user input selecting a plurality of libraries from a multiplicity of libraries, each library of the plurality of libraries comprising a plurality of reference spectra for use in matching to measured spectra during polishing of the substrate, each reference spectrum of the plurality of reference spectra having an associated index value;
   prior to polishing of the substrate, for a first zone of the substrate, receiving user input selecting a first subset of one or more libraries from the plurality of libraries; and
   prior to polishing of the substrate, for a second zone of the substrate, receiving user input selecting a second subset of one or more libraries from the plurality of libraries.

2. The method of claim 1, further comprising:
   polishing the substrate in a polishing apparatus;
   measuring a first sequence of spectra from the first zone of the substrate during polishing with an in-situ monitoring system;
   for each measured spectrum in the first sequence of spectra from the first zone, for each library from the first subset of one or more libraries from the plurality of libraries, determining a best matching reference spectrum; and
   for each library from the first subset of one or more libraries from the plurality of libraries, for each best matching reference spectrum for the first zone of the substrate, determining a first index value to generate a first sequence of first index values for each library from the first subset of libraries.

3. The method of claim 2, further comprising:
   measuring a second sequence of spectra from the second zone of the substrate during polishing with the in-situ monitoring system;
   for each measured spectrum in the second sequence of spectra from the second zone, for each library from the second subset of one or more libraries from the plurality of libraries, determining a best matching reference spectrum; and
   for each library from the second subset of one or more libraries from the plurality of libraries, for each best matching reference spectrum for the second zone of the substrate, determining a second index value to generate a second sequence of second index values for each library from the second subset of libraries.

4. The method of claim 3, further comprising, for each library from the first subset of one or more libraries, fitting a first function to the first sequence of first index values, and for each library from the second subset of one or more libraries, fitting a second function to the second sequence of second index values.

5. The method of claim 4, further comprising determining a goodness of fit for each library from the first subset of one or more libraries and determining a goodness of fit for each library from the second subset of one or more libraries.

6. The method of claim 5, further comprising selecting a first library having the best goodness of fit of the first subset of one or more libraries and selecting a second library having the best goodness of fit of the second subset of one or more libraries.

7. The method of claim 6, further comprising determining a projected time for the first zone to reach a first target index value based on the first function for the first library, and adjusting a polishing parameter for the second zone based on the second function of the second library to adjust the polishing rate of the second zone such that the second zone has closer to a second target index value at the projected time than without such adjustment.

8. The method of claim 7, wherein the polishing parameter is a pressure in a carrier head of the polishing apparatus.

9. The method of claim 6, further comprising displaying the first sequence of first index values and the first function for on the first library on a display.

10. The method of claim 6, further comprising displaying each first sequence of first index values and each first function for each of the first subset of one or more libraries simultaneously on a display.

11. The method of claim 1, wherein receiving user input selecting the plurality of libraries comprises displaying a drop-down list listing the multiplicity of libraries.

12. The method of claim 11, wherein receiving user input selecting the plurality of libraries further comprises selecting the plurality of libraries from the multiplicity of libraries in the drop-down list.

13. The method of claim 1, wherein receiving user input selecting the first subset of one or more libraries comprises displaying a user interface having a first check box for each of the plurality of libraries and receiving user input selecting or deselecting one or more first check boxes.

14. The method of claim 13, wherein receiving user input selecting the second subset of one or more libraries comprises displaying a user interface having a second check box for each of the plurality of libraries and receiving user input selecting or deselecting one or more second check boxes.

15. The method of claim 14, wherein the user interface having the first check box for each of the plurality of libraries and the user interface having the second check box for each of the plurality of libraries are displayed simultaneously.

16. The method of claim 15, wherein the first check box for each of the plurality of libraries and the second check box for each of the plurality of libraries are displayed in the same window.

17. A computer program product for configuring a polishing monitoring system, the product tangibly stored on machine readable medium, the product comprising instructions operable to cause a processor to:
   prior to polishing of a substrate, receive user input selecting a plurality of libraries from a multiplicity of libraries, each library of the plurality of libraries comprising a plurality of reference spectra for use in matching to measured spectra during polishing the substrate, each reference spectrum of the plurality of reference spectra having an associated index value;
   prior to polishing of the substrate, for a first zone of the substrate, receive user input selecting a first subset of one or more libraries from the plurality of libraries; and
   prior to polishing of the substrate, for a second zone of the substrate, receive user input selecting a second subset of one or more libraries from the plurality of libraries.

18. The method of claim 1, wherein receiving user input selecting the first subset of one or libraries comprises displaying a user interface having a first plurality of interface elements and receiving user input selecting or deselecting one or more of the first plurality of interface elements, and wherein receiving user input selecting the second subset of one or more libraries comprises displaying a user interface having a second plurality of interface elements and receiving user input selecting or deselecting one or more of the second plurality of interface elements.

19. The method of claim 1, wherein, for each library of the plurality of libraries, the plurality of reference spectra include an initial spectrum representing an expected start of polishing, a final spectrum representing an expected end of polishing, and spectra representing times in polishing between the expected start and the expected end.

\* \* \* \* \*

UNITED STATES PATENT AND TRADEMARK OFFICE
CERTIFICATE OF CORRECTION

| | | |
|---|---|---|
| PATENT NO. | : 8,954,186 B2 | Page 1 of 1 |
| APPLICATION NO. | : 12/847721 | |
| DATED | : February 10, 2015 | |
| INVENTOR(S) | : Jun Qian et al. | |

It is certified that error appears in the above-identified patent and that said Letters Patent is hereby corrected as shown below:

In The Claims

In Claim 9, column 20, line 16, change "on the" to -- the --.

In Claim 18, column 20, line 64, change "one or" to -- one or more --.

Signed and Sealed this
Twenty-sixth Day of May, 2015

Michelle K. Lee
*Director of the United States Patent and Trademark Office*